June 14, 1960     S. G. JOHNSON     2,940,175
PITCH DIAMETER GAGE WITH ROCKING GAGING ROLL, THE
STUD AND GAGING ROLLER COMBINATION, THE
GAGING ROLL, AND THE STUD
Filed May 13, 1958
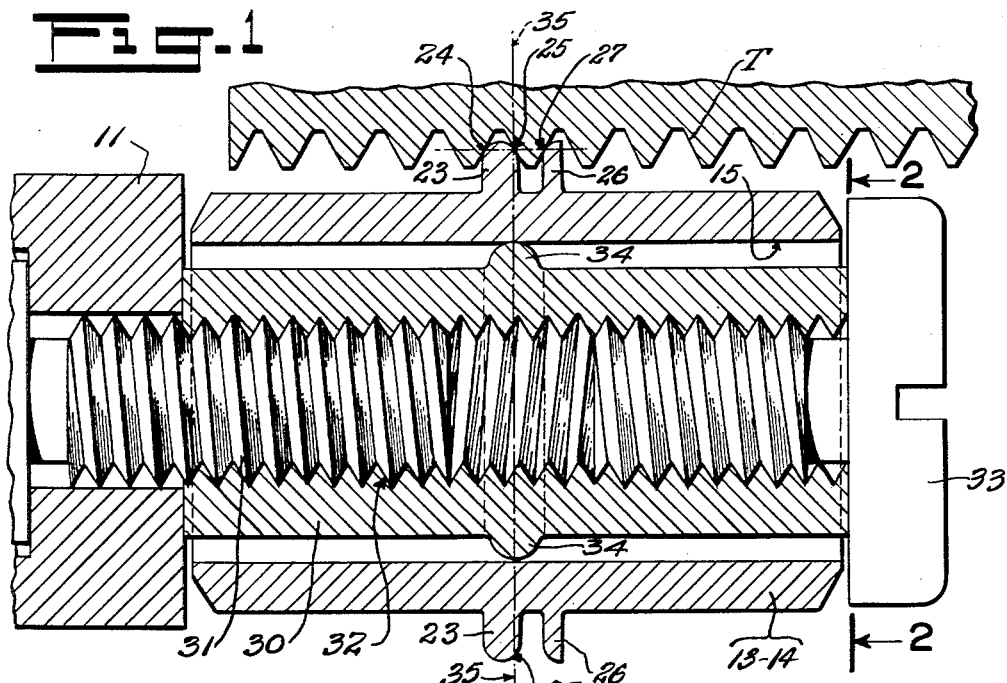
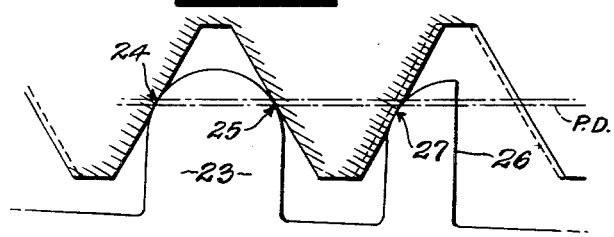
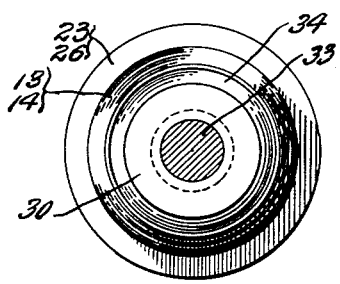
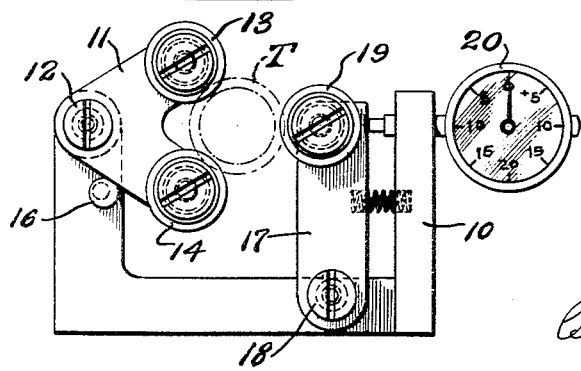
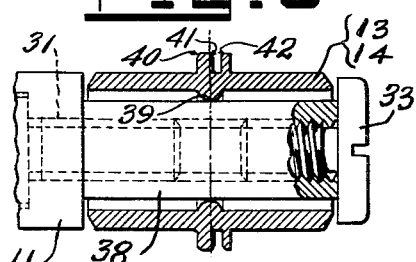
INVENTOR.
STANLEY G. JOHNSON
BY
ATTORNEYS United States Patent Office 2,940,175
Patented June 14, 1960

2,940,175

PITCH DIAMETER GAGE WITH ROCKING GAGING ROLL, THE STUD AND GAGING ROLLER COMBINATION, THE GAGING ROLL, AND THE STUD

Stanley G. Johnson, West Hartford, Conn., assignor to The Johnson Gage Development Company, Bloomfield, Conn., a corporation of Connecticut Filed May 13, 1958, Ser. No. 735,004

15 Claims. (Cl. 33—199)

The invention relates to a screw thread gage for more accurately testing a threaded part as to its pitch diameter which uses gaging rolls having thread gaging ridges for contacting the thread to be tested at the pitch diameter. The gage has application to the go and not-go type pitch diameter gages wherein the gaging rolls or roll studs are fixed in relative position as well as application to the comparator type of gage in which one gaging roll means is movable towards and away from another cooperating gaging roll means with an indicator indicating the variation of position of the movable gaging rolls with respect to the position of a perfect test part. The invention finds its greatest usefulness, however, in a pitch diameter thread gage having three gaging rolls spaced from each other so that the gaging rolls when in gaging position contact at or approximately at points 120 degrees spaced around the periphery of the test thread. With a three roll gage, the gage may be of the go and not-go type with fixedly spaced studs and gaging rolls, or the comparator type. The invention also is directed to the combination of gaging roll and stud, to the gaging roll and to the stud which mounts the gaging roll. Usually the go type of gage uses gaging rolls having a plurality of gaging ridges and the invention is not applicable to this form.

It is an object of the invention to construct a thread gage having a combination of gaging roll and a stud for the gaging roll which more accurately gages a thread for pitch diameter irrespective of lead error.

Another object of the invention is to construct a thread gaging roll and stud combination in which the gaging roll has gaging ridges providing three contact rings spaced a half pitch apart for engaging a test thread and in which the gaging roll is free to rock upon a rocking point or ridge which is in planar alignment with the center thread gaging ring.

Another object is to construct a gaging roll having three contact gaging rings spaced a half pitch apart and extending around the periphery thereof to provide three point contact with a test thread and also providing for rocking of the gaging roll on a rocking pivot or ridge which is in planar alignment with the center ring of the three contact rings.

A still further object is to construct a stud for a gaging roll which provides a rocking pivot for the gaging roll.

Other objects of the invention will be more apparent from the following description when taken in connection with the accompanying drawings illustrating preferred embodiments thereof in which:

Fig. 1 is an enlarged cross section through a gaging roll stud and a gaging roll of the invention;

Fig. 2 is a view of the gaging roll taken on line 2—2 of Fig. 1;

Fig. 3 is an illustrative view of the contact of the gaging ridges with the profile of a thread having a long lead;

Fig. 4 is a side view of a thread gage of the three roll comparator type; and

Fig. 5 is a partial view of an alternative form of gaging ridge for the gaging roll.

For gaging of the pitch diameter of a screw thread, it is common practice to use gaging rolls having a single gaging ridge around the periphery of the gaging roll for contacting the thread to be gaged. The gaging ridge on the gaging rolls may be of the cone type engaging within a thread groove, that is opposite flanks of adjacent thread helix, or the gaging ridge may be of the V type engaging opposite sides or flanks of a thread of the test part. Accurate determination of the pitch diameter is secured for a thread which has an accurate lead irrespective of whether the thread ridge is a cone or V type. If, however, the lead is inaccurate which frequently happens in the production of screw threads, the form of the thread is sufficiently different to introduce an inaccuracy irrespective of whether the gaging ridges are of the cone or V type. In other words, the thread groove remains the same but the thread itself is wider for a long pitch and narrower for a short pitch. This causes a variation in the pitch diameter which will result in an inaccurate determination of the pitch diameter of the thread irrespective of whether a cone type or a V type of thread gaging ridge is used. The pitch diameter of a screw thread is defined as that diameter where the width of the thread groove and the width of the thread parallel to the thread axis are equal.

For example in a long pitch thread the groove is the same but the thread is wider than for a perfect thread, the effect of which is to increase the pitch diameter. Hence with gaging ridges of the cone type, a reading for a long pitch thread is secured of the pitch diameter which is less than the actual pitch diameter since such gaging ridges ignore the wider thread. Gaging the same thread with gaging ridges of the V type, a reading is secured which is larger than the actual pitch diameter since this reading or gaging ignores a groove width which is unchanged. For a thread having a short lead, the reading will be the reverse as compared with a thread having a long lead since a thread with this lead inaccuracy has a groove with the same width but a narrower thread width. To secure an accurate reading for threads with inaccurate lead, a reading of pitch diameter should be taken with one gage having cone type gaging ridges only and a second gaging test made with a gage having gaging rolls with V type gaging ridges and the actual pitch diameter or pitch diameter error is between these two readings. The gage to be described herein secures an accurate pitch diameter gaging with a single gage for threads having a faulty pitch, either long or short and for threads having an accurate or perfect pitch.

It has been mentioned hereinbefore, that the invention is applicable to various types of gages but that it finds its widest application in the three roll type of gage. A particular type of three roll gage having a pivoted cradle for two of the gaging rolls, is illustrated in Fig. 4 which also is a comparator type of gage. The gage has a frame mechanism including a frame member 10 which carries a cradle 11 pivotally mounted on the frame on a cradle pivot 12. The cradle carries a pair of gaging roll means 13 and 14 or gaging rolls each mounted on a stud or stud means spaced from each other so that the gaging rolls engage a test part at or approximately at points spaced 120 degrees around the periphery of the test part T. A stop 16 is used to limit the downward movement of the cradle to gaging position for a comparator type of gage.

For the comparator type of gage illustrated, the frame mechanism includes a lever 17 which is pivotally mounted on the frame member 10 by a pivot 18 so that the gaging roll 19 carried by the lever is movable towards and away from the cooperating gaging means which in the gage illustrated comprises the gaging rolls 13 and 14. An indicator 20 carried by the frame member engages the lever 17 to indicate any deviation in the pitch diameter of the test part from that of a perfect thread. The gaging roll 19 may be the customary pitch diameter gaging roll having preferably a cone gaging ridge around the periphery thereof. The pivoted cradle is one of several ways in which the cooperating gaging means having a plurality of gaging rollers may be mounted for movement thereof for insertion and removal of a test thread into and out of gaging position.

Fig. 1 illustrates a longitudinal section through either of the gaging roll means 13 or 14 and its stud means. Each gaging roll means has a first gaging ridge 23 which is of the cone type, that is it engages within a thread groove and engages opposite flanks of two adjacent thread profiles within the groove. The gaging ridge has a point contact 24 on one side and a point contact 25 on the other side at the pitch diameter of a perfect thread. A second gaging ridge 26 is spaced from the first gaging ridge and has a single point contact 27 which also engages at the pitch diameter of a perfect test thread T on the opposite flank of the thread. The spacing between adjacent contact points or rings 24, 25 and 27 is a half pitch. There are provided therefore three point contacts with the contact 25 being a center point contact. With a roll, the point of contact may be anywhere on a line or ring extending around its respective ridge; however, only one point thereof for each ring comes into contact with a thread when gaging. The contours of the ridges are shown as circular.

Each gaging roll is mounted on a stud or stud means 30 carried by the frame mechanism and secured thereto in any suitable manner such as by a screw 31 which is received in the threaded hole 32 in the stud. In the construction illustrated the threaded hole extends through the stud and a retaining screw 33 is received on the outer end of the stud having a head large enough to retain the gaging roll on the stud. In the construction of Fig. 1, the stud carries a rocking pivot means shown as a rocking ridge 34 around its periphery shown particularly as a rounded ridge. This rocking ridge is located in a plane 35 which is at right angles to the axis of the stud and passes through the center point contact or contact ring 25 and the contact points 24 and 27 are equidistant on each side thereof. This rocking ridge has a maximum diameter 1 or 2 thousandths of an inch less than the hole 15 through the gaging roll so that the gaging roll may rock on the rocking ridge.

Figure 5 illustrates a construction similar to that of Fig. 1 but differing therefrom in two respects. The stud 38 has a cylindrical surface and the rocking pivot means 39 is carried in the hole of the gaging roll means or gaging roll in planar alignment with the contact ring 41. Since the gaging roll means rotates the rocking pivot means is a circular ridge. The internal diameter of the rocking ridge is about two thousandths of an inch greater than the diameter of the stud 38 so that the gaging roll has freedom to rock on the rocking ridge. The other difference is that the contacting surfaces or rings 40, 41 and 42 are flat surfaces having a width of about .005 inch with the contact rings engaging at the pitch diameter of the test part. The usual inaccuracy in lead of a thread is not sufficient to interfere with automatic rocking of the gaging roll even though the contacting rings or surfaces are flat rather than rounded as illustrated in Figs. 1 and 3. In this construction the center contacting point or ring 41 sets the location of the rocking ridge 39 so that it is in the same plane therewith at right angles to the axis of the gaging roll or gaging roll means.

In operation, if there is no fault in the thread such as a stagger thread or a faulty lead, the gaging roll means will engage the test thread with the axis of the gaging roll means parallel with the axis of the stud. There is illustrated in Fig. 3 in enlarged form, a profile of a thread having a long lead with a profile of an accurate thread shown in dotted lines for purposes of comparison. Upon the ridges 23 and 26 of the gaging roll means being brought into contact with the test thread, the gaging roll or gaging roll means will rock or cant on the rocking ridge under the pressure presented by the insertion of the test thread into the gage and the point contacts of the ridges seeking contact. Because the thread is slightly wider with a long lead, this wider dimension of the thread will impel the ridge 26 outwardly, or downwardly as shown in the figure, from the pitch line and the point contact of contact ring 24 will move inwardly or upwardly with respect to the pitch line, the ridges seeking three point contact. In this rocking of the gaging roll the point contact or ring 25, however, will automatically rest on the pitch diameter line PD with the result that the effective or real pitch diameter will be accurately gaged and the reading will not be influenced by the lead error.

For a thread having a short lead the gaging roll will rock or cant in the opposite direction by virtue of the fact that the groove is again the same but the thread is narrower and again the gaging ridges seeking three point contact will position the center point contact or ring 25 on the true pitch line. It will be observed, therefore, that the gaging ridge 23 has the aspect of a cone gaging ridge, that is it engages within a thread groove and the portion between the contacts 25 and 27 is of the V type in that its engagement is across the flanks of a thread. With the gage having the gaging roll and stud combination described, an accurate test of the pitch diameter is secured with one gage irrespective of lead error.

This invention is presented to fill a need for improvements in a pitch diameter gage with rocking gaging roll, the stud and gaging roller combination, the gaging roll, and the stud. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A screw thread gage comprising a frame mechanism, a gaging roll having a hole therein, a screw thread gaging ridge around the periphery of the gaging roll, a stud carried by the frame mechanism and received in the gaging roll hole to rotatably mount the roll, cooperating gaging mechanism including at least one gaging roll means having a hole therein, stud means carried by the frame mechanism for each gaging roll means to rotatably mount the same, the stud and stud means being spaced apart to cooperatively mount the gaging roll and the gaging roll means, the gaging roll means having a first gaging ridge with a contact ring on each side thereof spaced apart a half pitch width of a perfect thread to engage within a thread groove and a second gaging ridge spaced from the first gaging ridge and having a single contact ring spaced from the adjacent contact ring of the first gaging ridge by a half pitch width thereby providing a center contact ring, the gaging ridges at the contact rings having a dimension for engaging a perfect thread at the pitch diameter, and one of the aforsaid means including the gaging roll means and its stud means having a rocking pivot means in planar alignment with the center contact ring of the gaging roll means and engaging the other means.

2. A screw thread gage as in claim 1 in which the rocking pivot means is a circular ridge.

3. A screw thread gage as in claim 1 in which the rocking pivot means is carried by the stud means.

4. A screw thread gage as in claim 1 in which the rocking pivot means is carried in the hole of the gaging roll means.

5. A screw thread gage comprising a frame mechanism including a frame member and a pivotal frame member, a gaging roll having a hole therein, a screw thread gaging ridge around the periphery of the gaging roll, a stud carried by the frame mechanism and received in the gaging roll hole to rotatably mount the roll; cooperating gaging mechanism including a pair of gaging roll means each having a hole therein, stud means carried by the pivotal frame member for each gaging roll means to rotatably mount the same in spaced relation, the pivotal frame member mounting the stud means and gaging roll means for movement towards and away from gaging position, the stud and stud means being spaced apart to cooperatively mount the gaging roll and the gaging roll means, the gaging roll means having a first gaging ridge with a contact ring on each side thereof spaced apart a half pitch width of a perfect thread to engage within a thread groove and a second gaging ridge spaced from the first gaging ridge and having a single contact ring spaced from the adjacent contact ring of the first gaging ridge by a half pitch width thereby providing a center contact ring, the gaging ridges at the contact rings having a dimension for engaging a perfect thread at the pitch diameter, and one of the aforesaid means including each gaging roll means and its stud means having a circular rocking ridge in planar alignment with the center contact ring of the gaging roll means and engaging the other means.

6. A screw thread gage as in claim 5 including indicator means carried by the frame member to indicate the relative position of the gaging roll and the gaging roll means.

7. A screw thread gage as in claim 5 in which the frame mechanism includes a lever pivotally mounted on the frame member and carrying the stud and gaging roll, and an indicator carried by the frame member to indicate the relative position of the gaging roll.

8. A screw thread gaging roll and stud combination comprising gaging roll means having a hole therein, stud means received in the hole in the gaging roll means to rotatably mount the roll means, the gaging roll means having a first gaging ridge with a contact ring on each side thereof spaced apart a half pitch width and a second gaging ridge spaced from the first gaging ridge and having a single contact ring spaced from the adjacent contact ring on the first gaging ridge by a half pitch width thereby providing a center contact ring, the contact rings of the gaging ridges having a dimension for engaging a perfect thread at the pitch diameter, and one of the aforesaid means including the gaging means and the stud means having a rocking pivot means in planar alignment with the center contact ring of the gaging roll means and engaging the other means.

9. A screw thread gaging roll and stud combination as in claim 8 in which the rocking pivot means is carried by the stud means.

10. A screw thread gaging roll and stud combination as in claim 8 in which the rocking pivot means is a circular ridge carried in the hole of the gaging roll means.

11. A screw thread gaging roll comprising a gaging roll means having a hole therein, the gaging roll means having a first gaging ridge with a contact ring on each side thereof spaced apart a half pitch width of a perfect thread to engage within a thread groove, a second gaging ridge spaced from the first gaging ridge and having a single contact ring spaced from the adjacent contact ring of the first gaging ridge by a half pitch width thereby providing a center contact ring.

12. A screw thread gaging roll as in claim 11 including a rocking ridge carried within the hole of the gaging roll means and located in planar alignment with the center contact ring.

13. A screw thread gage comprising a frame mechanism, a gaging member having a hole therein, a screw thread gaging ridge carried by the gaging member, a stud carried by the frame mechanism and received in the gaging member hole to mount the member, cooperating gaging mechanism including at least one gaging means having a hole therein, a stud means carried by the frame mechanism for each gaging means to mount the same, the stud and stud means being spaced apart to cooperatively mount the gaging member and the gaging means, the gaging means having a first gaging ridge with a contact point on each side thereof spaced apart a half pitch width of a perfect thread to engage within a thread groove and a second gaging ridge spaced from the first gaging ridge and having a single contact point spaced from the adjacent contact point of the first gaging ridge by a half pitch width thereby providing a center contact point, the gaging ridges at the contact points having a dimension for engaging a perfect thread at the pitch diameter, and one of the aforesaid means including the gaging means and its stud means having a rocking pivot means in planar alignment with the center contact point of the gaging means and engaging the other means.

14. A screw thread gage comprising a frame mechanism including a frame member and a pivotal frame member, a gaging member having a hole therein, a screw thread gaging ridge carried by the gaging member, a stud carried by the frame mechanism and received in the gaging member hole to mount the member; cooperating gaging mechanism including a pair of gaging means each having a hole therein, stud means carried by the pivotal frame member for each gaging means to mount the same in spaced gaging relation, the pivotal frame member mounting the stud means and gaging means for movement towards and away from gaging position, the stud and stud means being spaced apart to cooperatively mount the gaging member and the gaging means, the gaging means having a first gaging ridge with a contact point on each side thereof spaced apart a half pitch width of a perfect thread to engage within a thread groove and a second gaging ridge spaced from the first gaging ridge and having a single contact point spaced from the adjacent contact point of the first gaging ridge by a half pitch width thereby providing a center contact point, the gaging ridges at the contact points having a dimension for engaging a perfect thread at the pitch diameter, and one of the aforesaid means including each gaging means and its stud means having a rocking ridge in planar alignment with the center contact of the gaging means and engaging the other means.

15. A screw thread gaging member and stud combination comprising gaging means having a hole therein, stud means received in the hole in the gaging means to mount the gaging means, the gaging means having a first gaging ridge with a contact point on each side thereof spaced apart a half pitch width of a perfect thread and a second gaging ridge spaced from the first gaging ridge and having a single contact point spaced from the adjacent contact point on the first gaging ridge by a half pitch width thereby providing a center contact point, the contact points of the gaging ridges having a dimension for engaging a perfect thread at the pitch diameter, and one of the aforesaid means including gaging means and its stud means having a rocking pivot means in planar alignment with the center contact point of the gaging means and engaging the other means.

References Cited in the file of this patent

UNITED STATES PATENTS

| | | |
|---|---|---|
| 2,594,143 | Fichter | Apr. 22, 1952 |
| 2,696,675 | Case | Dec. 14, 1954 |

UNITED STATES PATENT OFFICE
CERTIFICATE OF CORRECTION

Patent No. 2,940,175

June 14, 1960

Stanley G. Johnson

It is hereby certified that error appears in the printed specification of the above numbered patent requiring correction and that the said Letters Patent should read as corrected below.

Column 6, line 59, after "width" insert -- of a perfect thread --.

Signed and sealed this 8th day of November 1960.

(SEAL)
Attest:

KARL H. AXLINE
Attesting Officer

ROBERT C. WATSON
Commissioner of Patents